(12) United States Patent
Lan et al.

(10) Patent No.: US 7,569,982 B2
(45) Date of Patent: Aug. 4, 2009

(54) LIGHT SOURCE FOR A FLAT DISPLAY

(75) Inventors: Yuan-Ker Lan, Hsinchu (TW);
Horng-Bin Hsu, Taipei (TW);
Shin-Chin Tseng, Taichung (TW)

(73) Assignee: AU Optronics Corporation, Hsinchu (TW)

( * ) Notice: Subject to any disclaimer, the term of this patent is extended or adjusted under 35 U.S.C. 154(b) by 496 days.

(21) Appl. No.: 11/305,096

(22) Filed: Dec. 16, 2005

(65) Prior Publication Data

US 2007/0139581 A1  Jun. 21, 2007

(51) Int. Cl.
*H01J 1/62* (2006.01)
*H01J 63/04* (2006.01)

(52) U.S. Cl. .................. 313/493; 313/484; 313/485; 313/495; 349/61; 349/70

(58) Field of Classification Search .......... 313/483–497
See application file for complete search history.

(56) References Cited

U.S. PATENT DOCUMENTS

| | | | |
|---|---|---|---|
| 6,127,780 A | 10/2000 | Winsor | |
| 7,259,517 B2 * | 8/2007 | Hwang et al. | 313/594 |
| 7,259,518 B2 * | 8/2007 | Park et al. | 313/634 |
| 2006/0017392 A1 * | 1/2006 | Park et al. | 315/169.1 |
| 2006/0055296 A1 * | 3/2006 | Park et al. | 313/116 |

* cited by examiner

*Primary Examiner*—Nimeshkumar D. Patel
*Assistant Examiner*—Thomas A Hollweg
(74) *Attorney, Agent, or Firm*—Morris Manning Marting LLp; Tim Tingkang Xia, Esq.

(57) ABSTRACT

A planar photoluminescent lamp. In one embodiment, the planar photoluminescent lamp includes a plurality of barrier walls defining a plurality of channels, wherein each channel is with an axis and formed with a resistive portion characterized by a width, $A_r$, and a first capacitive portion and a second capacitive portion both characterized by a width, $A_c$, such that $A_c > A_r$. The planar photoluminescent lamp also includes a first electrode and a second electrode. The first electrode and the second electrode are substantially perpendicular to the axis of a channel and extend over the first capacitive portions and the second capacitive portions of the plurality of channels, respectively.

26 Claims, 6 Drawing Sheets

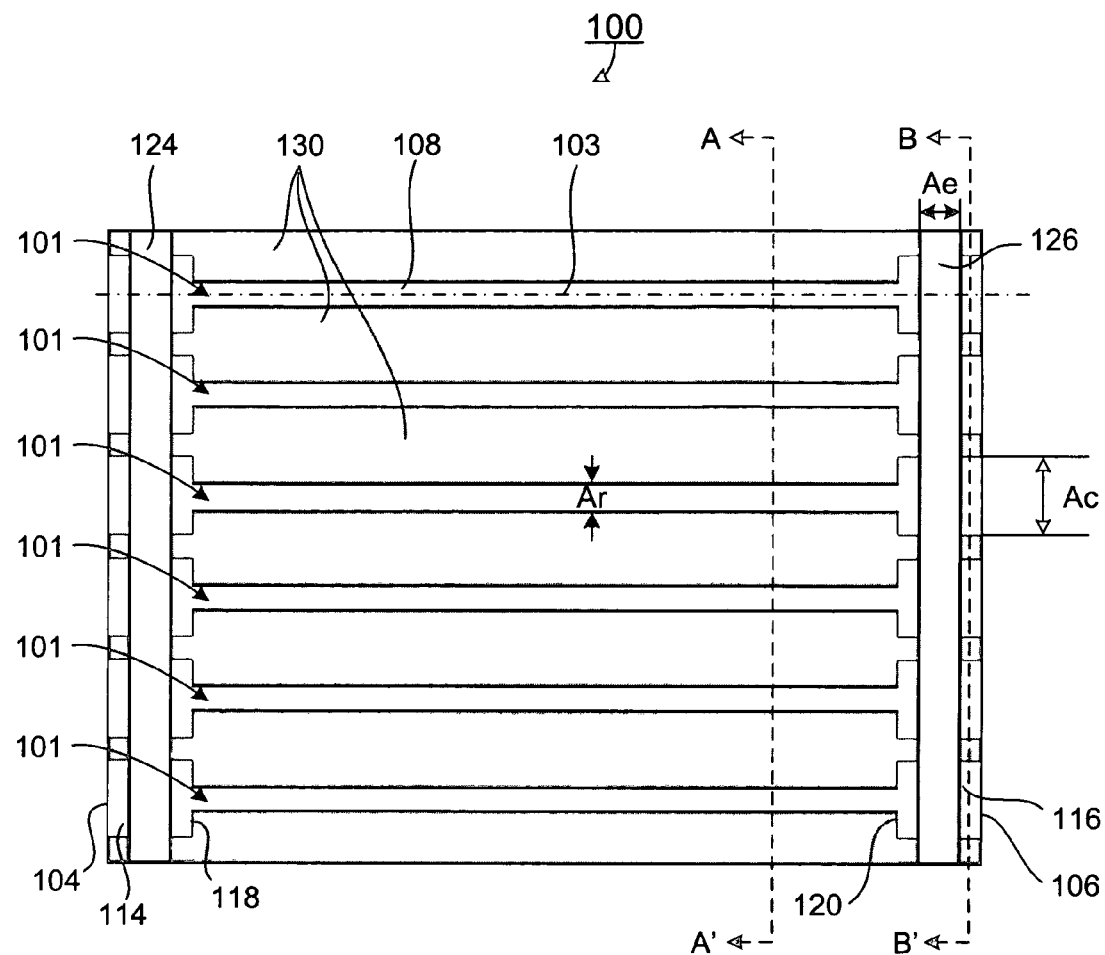
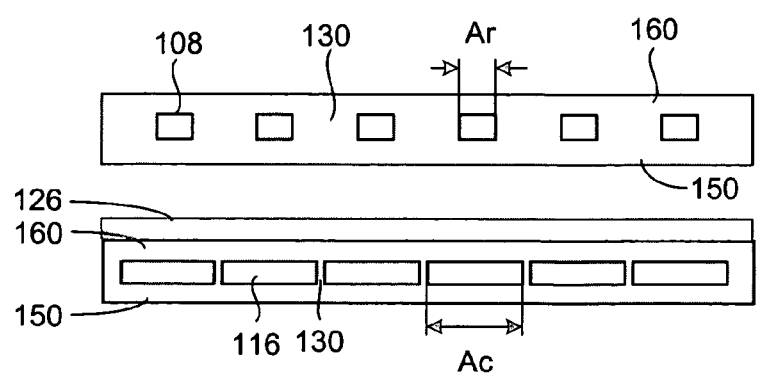
Fig. 1a
Fig. 1b
Fig. 1c

LIGHT SOURCE FOR A FLAT DISPLAY

FIELD OF THE INVENTION

The present invention is generally related to a light source, and, more particularly, is related to a planar photoluminescent lamp for use in a liquid crystal display system.

BACKGROUND OF THE INVENTION

Planar fluorescent lamps are useful in many applications, including backlights for liquid crystal displays (LCDs). A conventional planar fluorescent lamp 900 includes a spacer (not shown), a front glass plate 942 coated with a first fluorescent layer 952, and a rear glass plate 944 coated with a second fluorescent layer 954 to form a channel 930, as shown in FIG. 9. The planar fluorescent lamp 900 also includes four electrodes 912, 913, 914 and 915, where the electrodes 912 and 914 are positioned over a first end and a second end of the front glass plate 942, respectively, and the electrodes 913 and 915 are positioned over a first end and a second end of the rear glass plate 944, respectively. In operation, the planar fluorescent lamp 900 is driven by a high voltage applying to the electrodes 912-915 such that electric discharging is generated through the front glass plate 942 and the rear glass plate 944 to excite the fluorescent layers 952 and 954, and the channel 930 emits light.

FIG. 8 shows an effective circuit 800 of a conventional planar fluorescent lamp. In such a planar fluorescent lamp, glass plates contacted by electrodes can effectively be accounted as capacitors 812 and 814 having an effective capacitance $C = \in A/d$, where $\in$ is the dielectric constant of the glass plates, d is the thickness of the glass plates, and A is the contact area of the electrodes with the fluorescent channel (tube) 820. The planar fluorescent lamp is powered by an inverter 840. The relationship of the impedance $X_c$ of the lamp channel 820 and the effective capacitance C is determined by $X_c = 1/(j\omega C)$, wherein j is the imaginary number and $\omega$ is the frequency of the current passing through the lamp channel 820. Accordingly, decreasing the effective capacitance C results in increasing the impedance $X_c$.

It is known in the art that the thinner a channel (lamp tube) is, the higher the light emission efficiency of the channel (lamp tube) is. As shown in FIG. 10, a conventional planar fluorescent lamp 1000 usually utilizes a plurality of thin and uniform channels 1020 formed substantially in parallel to improve its light intensity and quality, where each of the plurality of thin and uniform channels 1020 has a width, $A_c$, and is contacted with two electrodes 1012 and 1014, each having a width, $A_e$. The electrode contact area of a channel 1020 with the electrode 1012 (1014) is determined by ($A_c \times A_e$). However, a conventionally thin channel means that the channel has a small, uniform width, and thus a small electrode contact area results in a small effective capacitance thereof. When the effective capacitance decreases, the impedance of the channel increases accordingly, thereby resulting in the increase of the operating voltage of the channel and the decrease of the channel current. The former may result in the generation of ozone and pin-holes in the channel and the latter may produce an insufficient amount of light and reduce the light emission efficiency of the channel.

Therefore, a heretofore unaddressed need exists in the art to address the aforementioned deficiencies and inadequacies.

SUMMARY OF THE INVENTION

In one aspect, the present invention relates to a planar photoluminescent lamp. In one embodiment, the planar photoluminescent lamp has a lower substrate, an upper substrate overlying and spaced from the lower substrate and a plurality of barrier walls, located between the lower substrate and the upper substrate, defining a plurality of channels with the lower substrate and the upper substrate. The plurality of channels are formed substantially in parallel. Each channel is with a first end, an opposite, second end and an axis and formed with a first capacitive portion located at the first end, a second capacitive portion located at the second end, and a resistive portion located between the first capacitive portion and the second capacitive portion. The resistive portion is characterized by a width, $A_r$, while the first capacitive portion and the second capacitive portion are characterized by a width, $A_c$, where $A_c > A_r$. In one embodiment, the ratio of $A_c$ to $A_r$ is in the range of 1 to 100. Each of the first capacitive portion and the second capacitive portion has a cross-sectional shape selected from the list of a circle, an oval, a closed loop, a triangle, a quadrilateral and a polygon. The resistive portion has a cross-sectional shape selected from the list of a circle, an oval, a closed loop, a triangle, a quadrilateral and a polygon.

Each of the plurality of channels is further formed with a first shoulder portion connecting the resistive portion with the first capacitive portion. In one embodiment, the first shoulder portion is formed such that the width of the channel is gradually changed from the width $A_r$ of the resistive portion to the width $A_c$ of the first capacitive portion. In another embodiment, the first shoulder portion is formed such that the width of the channel is sharply changed from the width $A_r$ of the resistive portion to the width $A_c$ of the first capacitive portion.

Each of the plurality of channels may also be formed with a second shoulder portion connecting the resistive portion with the second capacitive portion. In one embodiment, the second shoulder portion is formed such that the width of the channel is gradually changed from the width $A_r$ of the resistive portion to the width $A_c$ of the second capacitive portion. In another embodiment, the second shoulder portion is formed such that the width of the channel is sharply changed from the width $A_r$ of the resistive portion to the width $A_c$ of the second capacitive portion.

Additionally, the planar photoluminescent lamp has a first electrode positioned in proximity with the first end of the channel and a second electrode positioned in proximity with the second end of the channel. The first electrode and the second electrode are substantially perpendicular to the axis of a channel and extend over the first capacitive portions and the second capacitive portions of the plurality of channels, respectively.

Furthermore, the planar photoluminescent lamp includes a fluorescent material and/or a discharge gas located within each of the plurality of channels.

In another aspect, the present invention relates to a planar photoluminescent lamp. In one embodiment, the planar photoluminescent lamp includes barrier means having at least one channel having a first end, an opposite, second end and an axis, that is, according to the referred embodiment, the lower substrate, the upper substrate and the plurality of barrier walls are formed into one piece. The at least one channel is formed with a first capacitive portion located at one of the first end and the second end, and a resistive portion. In one embodiment, the at least one channel is further formed with a second capacitive portion located at the other one of the first end and the second end such that the resistive portion is between the first capacitive portion and the second capacitive portion. The resistive portion, the first capacitive portion and the second capacitive portion of the at least one channel are characterized by widths, $A_r$, $A_{c1}$, and $A_{c2}$, respectively, where $A_{c1} > A_r$ and $A_{c2} > A_r$. In one embodiment, the ratio of $A_{c1}$ to $A_r$, and the ratio of $A_{c2}$ to $A_r$ are in the range of 1 to 100.

The at least one channel is further formed with a first shoulder portion connecting the resistive portion with the first capacitive portion. In one embodiment, the first shoulder portion is formed such that the width of the at least one channel is gradually changed from the width $A_r$ of the resistive portion to the width $A_{c1}$ of the first capacitive portion. In another embodiment, the first shoulder portion is formed such that the width of the at least one channel is sharply changed from the width $A_r$ of the resistive portion to the width $A_{c1}$ of the first capacitive portion.

Furthermore, the planar photoluminescent lamp includes at least one electrode positioned substantially perpendicular to the axis of the at least one channel and extending over the first capacitive portion of the at least one channel. The planar photoluminescent lamp may also include an additional electrode positioned in proximity with the other end of the first end and the second end, substantially perpendicular to the axis of the at least one channel, and extending over the second capacitive portion of the at least one channel.

In yet another aspect, the present invention relates to an LCD system. In one embodiment, the LCD system includes an LCD panel and at least one lamp for producing light to illuminate the LCD panel. The at least one lamp has barrier means having at least one channel with a first end, an opposite, second end and an axis, that is, according to the referred embodiment, the lower substrate, the upper substrate and the plurality of barrier walls are formed into one piece. The at least one channel is formed with a resistive portion characterized by a width, $A_r$, and a first capacitive portion characterized by a width, $A_{c1}$ such that $A_{c1} > A_r$. The first capacitive portion is located at one of the first end and the second end. The at least one channel may be further formed with a second capacitive portion located at the other end of the first end and the second end such that the resistive portion is between the first capacitive portion and the second capacitive portion, where the second capacitive portion is characterized by a width, $A_{c2}$, such that $A_{c2} > A_r$.

The at least one lamp further has at least one electrode positioned substantially perpendicular to the axis of the at least one channel and extending over the first capacitive portion of the at least one channel. In one embodiment, the at least one lamp also may have an additional electrode positioned in proximity with the other end of the first end and the second end, substantially perpendicular to the axis of the at least one channel, and extending over the second capacitive portion of the at least one channel.

In a further aspect, the present invention relates to a method for improving the efficiency of lighting in an LCD system, where the LCD system has an LCD panel and at least one lamp for producing light to illuminate the LCD panel. The at least one lamp, in one embodiment, has barrier means having at least one channel with an axis, wherein the at least one channel is formed with a resistive portion characterized by a width, $A_r$, and a first capacitive portion characterized by a width, $A_{c1}$, and at least one electrode positioned substantially perpendicular to the axis of the at least one channel and extending over the first capacitive portion of the at least one channel. In one embodiment, the method comprises the step of increasing the ratio of $A_{c1}$ to $A_r$ so as to increase the area of contact between the at least one electrode and the first capacitive portion of the at least one channel. In one embodiment, the ratio of $A_{c1}$ to $A_r$ is in the range of 1 to 100. When the area of contact between the at least one electrode and the first capacitive portion of the at least one channel increases, an effective capacitance related to the LCD system increases accordingly, thereby reducing a corresponding impedance related to the LCD system to allow an efficient illumination.

In yet a further aspect, the present invention relates to a planar photoluminescent lamp. In one embodiment, the planar photoluminescent lamp has barrier means having at least a first channel and a second channel, that is, according to the referred embodiment, the lower substrate, the upper substrate and the plurality of barrier walls are formed into one piece. The first channel is with a first end, an opposite, second end and an axis and formed with a resistive portion characterized by a width, $A_{ra}$, and a first capacitive portion characterized by a width, $A_{ca}$, such that $A_{ca} > A_{ra}$ where the first capacitive portion is located at one of the first end and the second end and between that one end and the resistive portion. In one embodiment, the ratio of $A_{ca}$ to $A_r$ is in the range of 1 to 100.

The second channel is with a first end, an opposite, second end and an axis and formed with a resistive portion characterized by a width, $A_{rb}$, and a first capacitive portion characterized by a width, $A_{cb}$, such that $A_{cb} > A_{rb}$, and the first capacitive portion is located at one of the first end and the second end and between that one end and the resistive portion, and positioned substantially in parallel to the first channel. In one embodiment, the ratio of $A_{cb}$ to $A_r$ is in the range of 1 to 100. In one embodiment, the ratio of $A_{cb}$ to $A_{ca}$ is substantially equal to one. In another embodiment, the ratio of $A_{cb}$ to $A_{ca}$ is not equal to one.

The planar photoluminescent lamp also has at least one electrode positioned substantially perpendicular to the axes of the first channel and the second channel and extending over the first capacitive portions of the first channel and the second channel.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment, and wherein:

FIGS. 1a-1c show schematically a planar photoluminescent lamp according to one embodiment of the present invention: FIG. 1a is a top view, FIG. 1b is a cross sectional view along with the line A-A', and FIG. 1c is a cross sectional view along with the line B-B'.

FIG. 5a is a cross sectional view at a resistive portion, FIG. 5b is a cross sectional view at a capacitive portion.

FIG. 6a is according to one embodiment of the present invention, FIG. 6b is according to another embodiment of the present invention, and FIG. 6c is according to an alternative embodiment of the present invention.

FIG. 7a is a top view, FIG. 7b is a cross sectional view along with the line A-A', and FIG. 7c is a cross sectional view along with the line B-B'.

FIG. 10a is a top view, FIG. 10b is a cross sectional view along with the line A-A', and FIG. 10c is a cross sectional view along with the line B-B'.

DETAILED DESCRIPTION OF THE INVENTION

Figure 2:
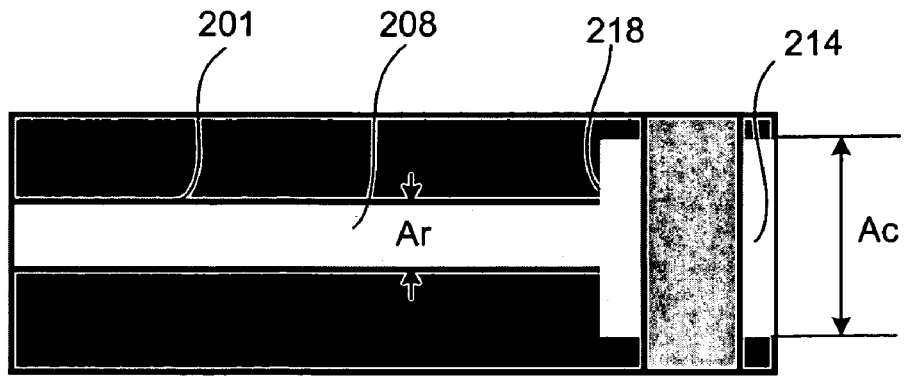
FIG. 2 shows partially a top view of a planar photoluminescent lamp according to one embodiment of the present invention.

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

The description will be made as to the embodiments of the present invention in conjunction with the accompanying drawings of FIGS. 1a-7c. In accordance with the purposes of this invention, as embodied and broadly described herein, this invention, in one aspect, relates to a planar photoluminescent lamp with the enhancement of efficiency by increasing electrode contact areas in channels of the planar photoluminescent lamp.

Referring now to FIGS. 1a-1c, a planar photoluminescent lamp 100 is shown according to one embodiment of the present invention. In the embodiment, the planar photoluminescent lamp 100 has a lower substrate 150, an upper substrate 160 overlying and spaced from the lower substrate 150 and a plurality of barrier walls 130, located between the lower substrate 150 and the upper substrate 160, defining a plurality of channels 101. For example, six channels 101 are defined in the embodiment shown in FIG. 1a. The six channels 101 are formed substantially in parallel. More or less numbers of channels can be utilized to practice the present invention. Any two neighboring channels 101 are separated by one of the barrier walls 130. Each channel 101 is with a first end 104 and an opposite, second end 106 and an axis 103 and formed with a first capacitive portion 114 located at the first end 104 and a second capacitive portion 116 located at the second end 106, and a resistive portion 108 located between the first capacitive portion 114 and the second capacitive portion 116. The resistive portion 108 is characterized by a width, $A_r$, as shown in FIGS. 1a and 1b, and both the first capacitive portion 114 and the second capacitive portion 116 are characterized by a width, $A_c$, where the size of $A_c$ is greater than the size of $A_r$, as shown in FIGS. 1a and 1c. In one embodiment, the ratio of $A_c$ to $A_r$ is in the range of 1 to 100. In another embodiment, the first capacitive portion 114 and the second capacitive portion 116 of the channel 101 may be characterized by widths, $A_{c1}$ and $A_{c2}$, respectively. The width $A_{c1}$ of the first capacitive portion 114 and the width $A_{c2}$ of the second capacitive portion 116 can be identical, i.e., $A_{c1}=A_{c2}$, or different, i.e., $A_{c1} \neq A_{c2}$.

In the embodiment shown in FIGS. 1b-1c, the cross-sectional shape of each of the first capacitive portion 114 and the second capacitive portion 116 is a rectangle and the cross-sectional shape of the resistive portion 108 is a rectangle as well, but $A_r < A_c$. The channel 101 can also be formed in various geometries. For example, the cross-sectional shape of each of the first capacitive portion 114 and the second capacitive portion 116 may be a circle, an oval, a closed loop, a triangle, a quadrilateral, or a polygon. The cross-sectional shape of the resistive portion 108 may be a circle, an oval, a closed loop, a triangle, a quadrilateral, or a polygon.

As shown in FIG. 1a, each channel 101 is further formed with a first shoulder portion 118 connecting the resistive portion 108 with the first capacitive portion 114, and a second shoulder portion 120 connecting the resistive portion 108 with the second capacitive portion 116. As shown in FIG. 1, the first shoulder portion 118 is formed such that the width of the channel 101 is sharply changed from the width $A_r$ of the resistive portion 108 to the width $A_c$ of the first capacitive portion 114. Each second shoulder portion 120 is also formed such that the width of the channel 101 is sharply changed from the width $A_r$ of the resistive portion 108 to the width $A_c$ of the second capacitive portion 116. The first shoulder portion 118 can also be formed such that the width of the channel 101 is gradually changed from the width $A_r$ of the resistive portion 108 to the width $A_c$ of the first capacitive portion 114. The second shoulder portion 120 may also be formed such that the width of the channel 101 is gradually changed from the width $A_r$ of the resistive portion 108 to the width $A_c$ of the second capacitive portion 116.

Additionally, each channel 101 is filled with a florescent material and a discharge gas.

As shown in FIG. 1a, the planar photoluminescent lamp 100 has a first electrode 124 that is positioned in proximity with the first end(s) 104 of the six channels 101 and is substantially perpendicular to the axis 103 of a channel 101. The planar photoluminescent lamp 100 also has a second electrode 126 that is positioned in proximity with the second end(s) 106 of the six channels 101 and is substantially perpendicular to the axis 103 of a channel 101. The first electrode 124 and the second electrode 126 extend over the first capacitive portions 114 and the second capacitive portions 116 of the six channels 101, respectively. Each of the first electrode 124 and the second electrode 126 is characterized with a width, $A_e$. Accordingly, the contact area of each of the first electrode 124 and the second electrode 126 with a channel 101 is determined by $\sigma=(A_e \times A_c)$ The larger the contact area $\sigma$ is, the smaller the impedance associated with the channel 101 is.

Figure 3:
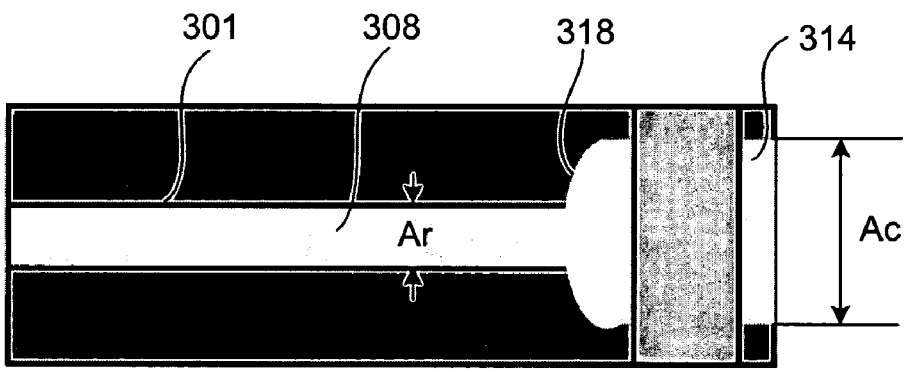
FIG. 3 shows partially a top view of a planar photoluminescent lamp according to another embodiment of the present invention.
Figure 4:
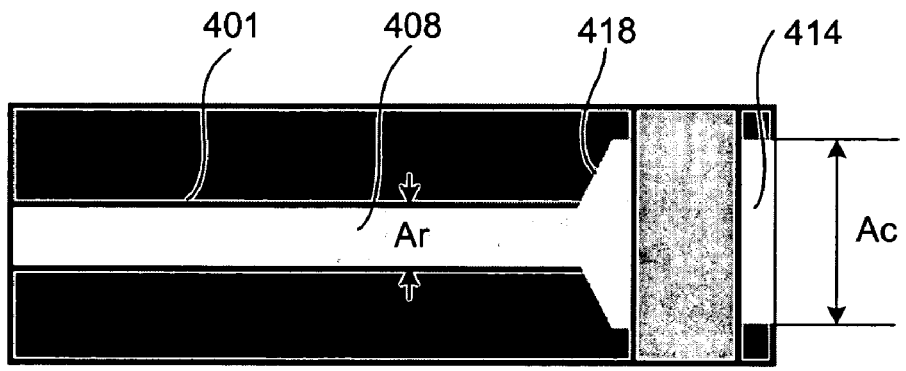
FIG. 4 shows partially a top view of a planar photoluminescent lamp according to an alternative embodiment of the present invention.

Referring to FIGS. 2-4, a planar photoluminescent lamp is partially shown according to various embodiments of the present invention. In the embodiment shown in FIG. 2, a channel 201 of a planar photoluminescent lamp is formed with a resistive portion 208, a capacitive portion 214 and a shoulder portion 218 formed at the junction of the resistive portion 208 and the capacitive portion 214. The resistive portion 208 and the capacitive portion 214 are characterized by widths $A_r$ and $A_c$, respectively. The shoulder portion 218 is formed such that the width of the channel 201 is sharply changed from the width $A_r$ of the resistive portion 208 to the width $A_c$ of the capacitive portion 214, as shown in FIG. 2. FIGS. 3 and 4 respectively show two other embodiments of a planar photoluminescent lamp, where a channel 301 (401) is formed with a shoulder portion 318 (418) formed at the junction of a resistive portion 308 (408) and a capacitive portion 314 (414) of the channel 301 (401) such that the width of the channel 301 (401) is gradually changed from the width $A_r$ of the resistive portion 308 (408) to the width $A_c$ of the capacitive portion 314 (414).

Figure 5A:
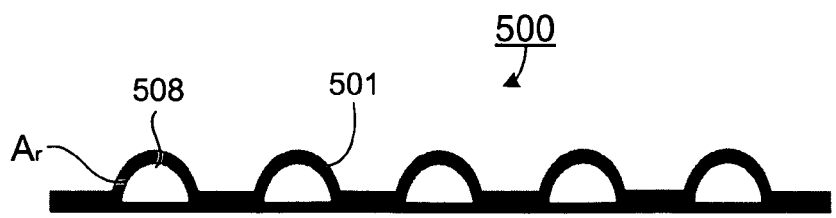
FIGS. 5a-5b show schematically a planar photoluminescent lamp according to one embodiment of the present invention.
Figure 5B:
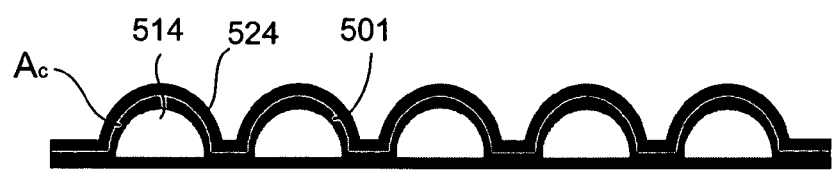

Referring to FIGS. 5a-5b, a planar photoluminescent lamp 500 is shown according to another embodiment of the present invention. In this exemplary embodiment, the planar photoluminescent lamp 500 includes a channel 501 formed with a resistive portion 508 and a capacitive portion 514. Both the resistive portion 508 and the capacitive portion 514 have cross-sectionally a semi-oval shape. Accordingly, the width $A_c$ of the capacitive portion 514 and the width $A_r$ of the resistive portion 508 are corresponding to arc lengths of the semi-oval capacitive portion 514 and the semi-oval resistive portion 508, respectively, as shown in FIGS. 5a-5b, where $A_r<A_c$. In this embodiment, the electrode 524 extending over capacitive portions 514 of the six channels 501 has a cross-sectional shape of a semi-oval as well.

Figure 6A:
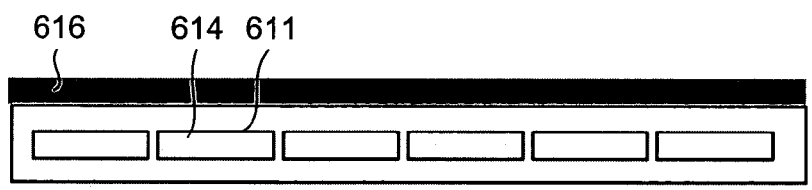
FIGS. 6a-6c show schematically a cross sectional view of a planar photoluminescent lamp.
Figure 6B:
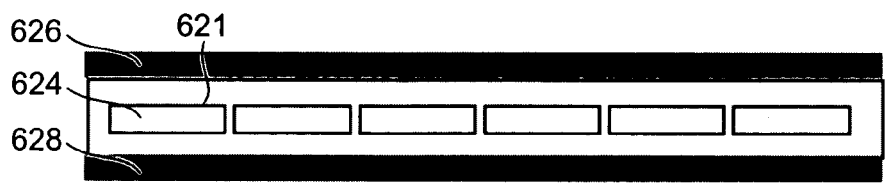
Figure 6C:
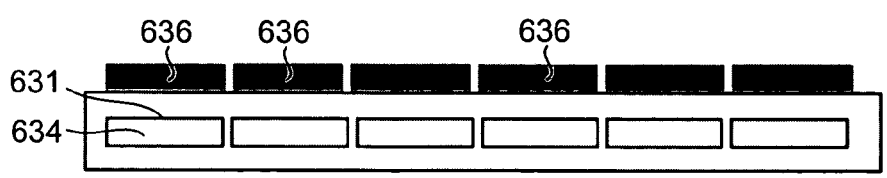

FIGS. 6a-6c show three different embodiments of a planar photoluminescent lamp of the present invention. In the embodiment shown in FIG. 6a, the planar photoluminescent lamp has a single electrode 616 positioned and extending over capacitive portions 614 of six channels 611. In another embodiment, as shown in FIG. 6b, the planar photoluminescent lamp has a pair of electrodes 626 and 628 positioned and extending over a top side and a bottom side of capacitive portions 624 of six channels 621, respectively. In an alternative embodiment, as shown in FIG. 6c, the planar photoluminescent lamp has six electrode 636 with each positioned over a capacitive portion 634 of a channel 631. Accordingly, the amount of light of each channel in the planar photoluminescent lamp shown in FIG. 6c can individually be adjusted. Other numbers of electrodes can also be used to practice the present invention.

Figure 7A:
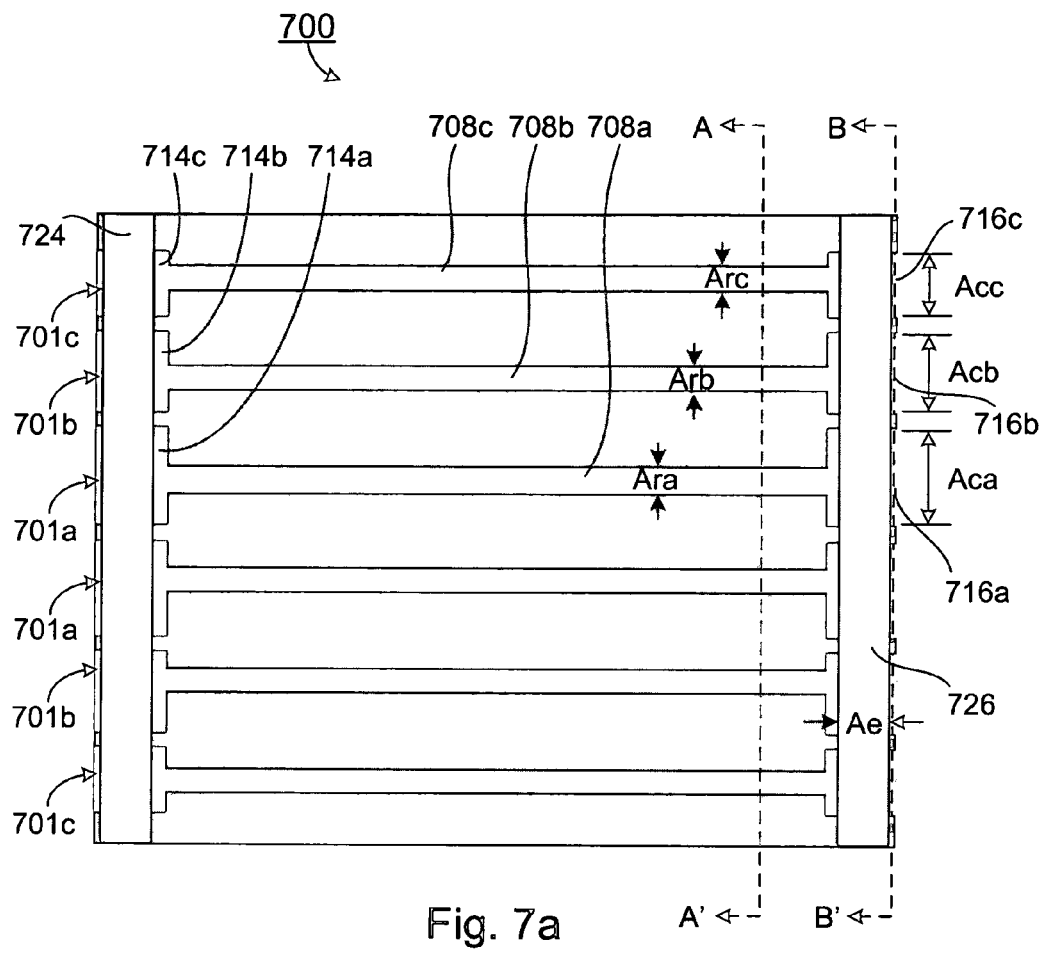
FIGS. 7a-7c show schematically a planar photoluminescent lamp according to one embodiment of the present invention.
Figure 7B:
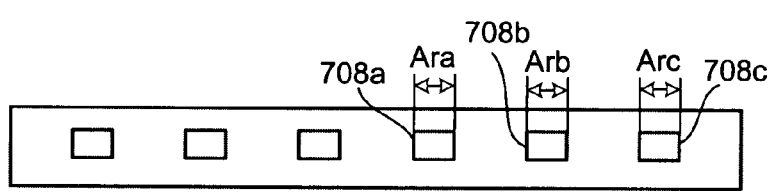
Figure 7C:
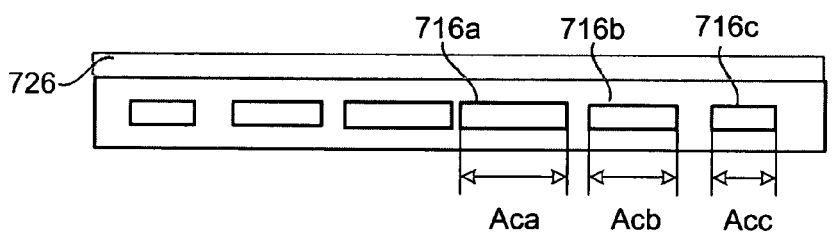
Figure 8:
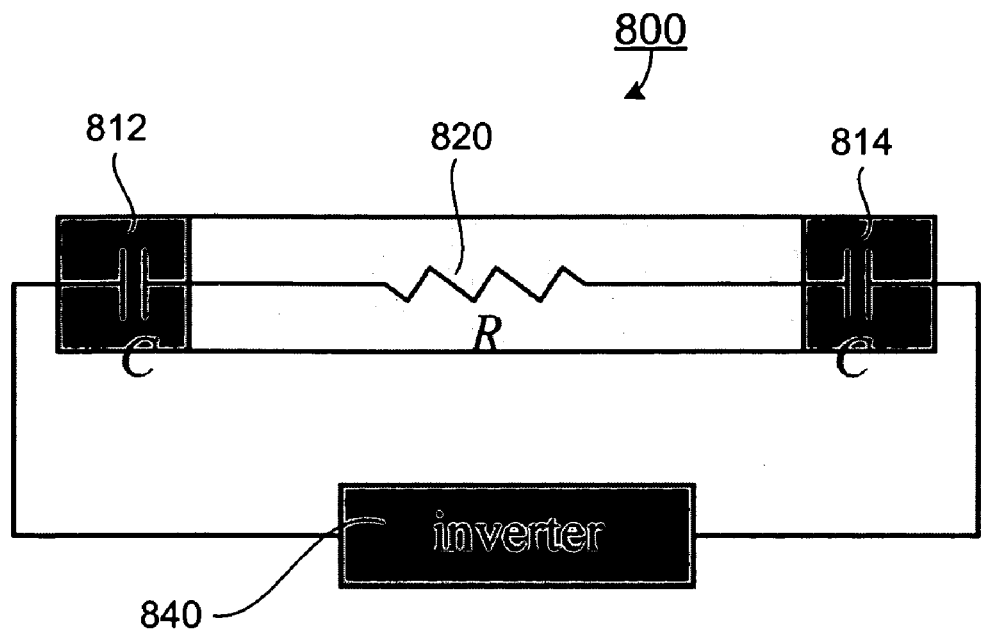
FIG. 8 shows schematically an effective circuit of a planar photoluminescent lamp.
Figure 9:
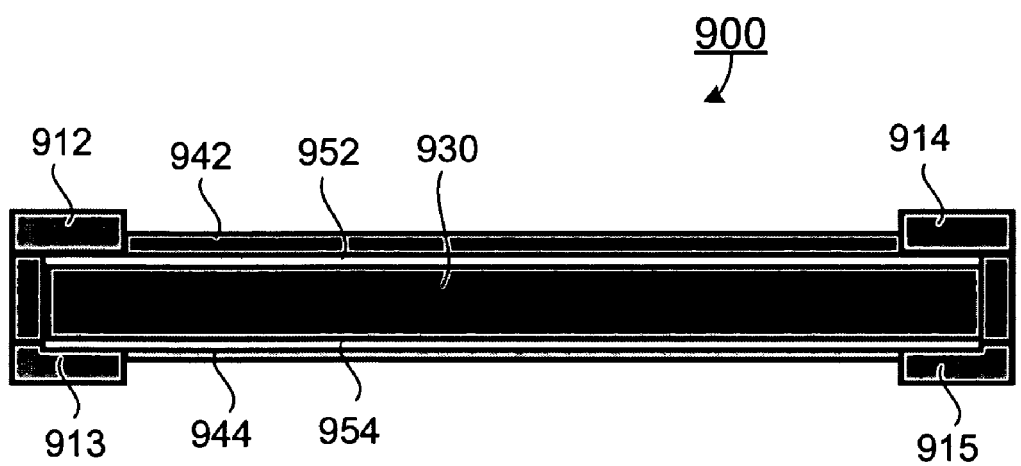
FIG. 9 shows schematically a side view of a conventional planar photoluminescent lamp.
Figure 10A:
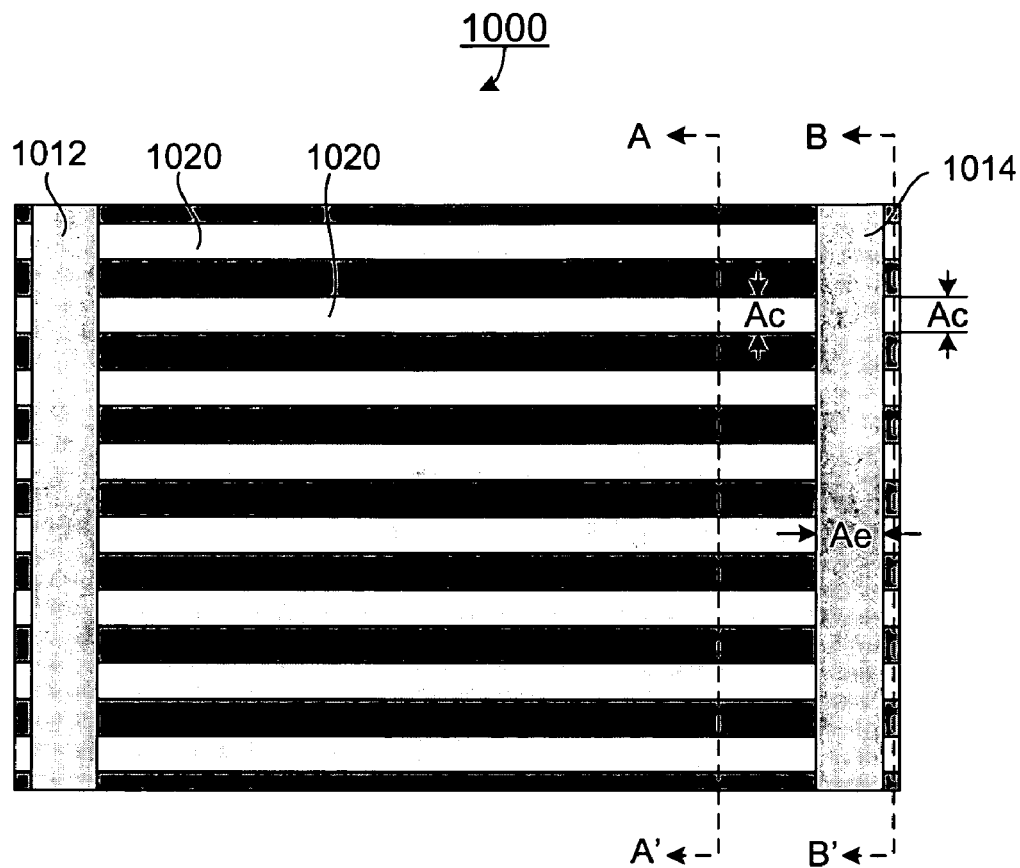
FIGS. 10a-10c show schematically a view of a conventional planar photoluminescent lamp.
Figure 10B:
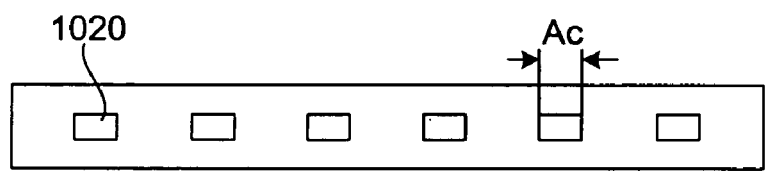
Figure 10C:
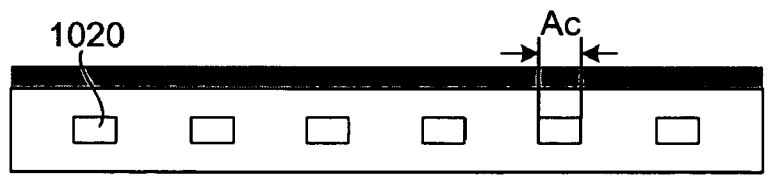

Referring to FIGS. 7a-7c, a planar photoluminescent lamp 700 is shown according to another embodiment of the present invention. In the exemplary embodiment, three pairs of channels 701a, 701b and 701c are formed symmetrically and substantially in parallel in the planar photoluminescent lamp 700. Each channel 701i is formed with a first capacitive portion 714i located at a first end of the channel 701i and a second capacitive portion 716i located at a second end of the of the channel 701i, and a resistive portion 708i located between the first capacitive portion 714i and the second capacitive portion 716i, where i=a, b, or c. The resistive portions 708a, 708b and 708c of the channels 701a, 701b and 701c are characterized by widths $A_{ra}$, $A_{rb}$ and $A_{rc}$, respectively, as shown in FIGS. 7a and 7b. These widths $A_{ra}$, $A_{rb}$ and $A_{rc}$ can be identical or different. In this embodiment of FIGS. 7a-7c, these widths $A_{ra}$, $A_{rb}$ and $A_{rc}$ are identical, i.e., $A_{ra}=A_{rb}=A_{rc}$. The first capacitive portion 714i and the second capacitive portion 716i of the pair of channel 701i are characterized by an identical width $A_{ci}$. As shown in FIGS. 7a and 7c, the widths of capacitive portions of the three pair of channels 701a, 701b and 701c are different, that is, $A_{ca}>A_{cb}>A_{cc}$. Also, these widths $A_{ca}$, $A_{cb}$ and $A_{cc}$ are greater than $A_{ra}$, $A_{rb}$ and $A_{rc}$, respectively. In this embodiment, the contact areas of the three pairs of channels 701i with corresponding electrodes 724 and 726 having a width, $A_e$, are different. For example, the contact area of the pair of channels 701i with the electrode 726 (724) is defined by $\sigma_i=(A_{ci} \times A_e)$, where i=a, b and c. Accordingly, the contact area $\sigma_a$ of the pair of channel 701a with the electrode 726 (724) is greater than the contact area $\sigma_b$ of the pair of channel 701b with the electrode 726 (724), which, in turn, is greater than the contact area $\sigma_c$ of the pair of channel 701c with the electrode 726 (724), i.e., $\sigma_a>\sigma_b>\sigma_c$.

In the exemplary embodiment shown in FIGS. 7a-7c, the light emitted from the planar photoluminescent lamp 700 in a center area where the pair of channels 701a are formed is brighter than the light in side areas where the pair of channels 701c are formed. Other arrangements of the channels can also be employed to practice the present invention. For example, the pair of channels 701c can be formed in the center area of the planar photoluminescent lamp 700, while the pair of channels 701a can be formed in two side areas of the planar photoluminescent lamp 700. Accordingly, the light of the planar photoluminescent lamp 700 in the center area is dimmer than the light in side areas.

The planar photoluminescent lamp of the present invention can find many applications in a wide spectrum of fields. For example, the planar photoluminescent lamp can be used as a backlight module to illuminate an LCD panel. When the area of contact between an electrode and a capacitive portion of a channel of the planar photoluminescent lamp increases, an effective capacitance related to the LCD system increases accordingly, thereby reducing corresponding impedance related to the LCD system to allow an efficient illumination.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A planar photoluminescent lamp, comprising:
   a. a lower substrate;
   b. an upper substrate disposed over the lower substrate;
   c. a plurality of barrier walls, located between the lower substrate and the upper substrate, defining a plurality of straight channels with the lower substrate and the upper substrate, wherein the plurality of straight channels are not connected to each other, and each channel is with a first end, an opposite, second end and an axis, and is formed with a resistive portion characterized by a width, $A_r$, and a first capacitive portion and a second capacitive portion both characterized by a width, $A_c$, such that $A_c>A_r$, wherein the first capacitive portion is located at the first end, the second capacitive portion is located at the second end, and the resistive portion is located between the first capacitive portion and the second capacitive portion, and wherein the plurality of straight channels has at least a first channel and a second channel configured such that the width of the first capacitive portion of the first channel and the width of the first capacitive portion of the second channel are different;
   d. a first electrode positioned in proximity with the first end, substantially perpendicular to the axis of a channel, and extending over the first capacitive portions of each of the plurality of straight channels; and
   e. a second electrode positioned in proximity with the second end, substantially perpendicular to the axis of a channel, and extending over the second capacitive portions of each of the plurality of straight channels.

2. The planar photoluminescent lamp of claim 1, further comprising a fluorescent material located within each of the plurality of straight channels.

3. The planar photoluminescent lamp of claim 2, further comprising a discharge gas located within each of the plurality of straight channels.

4. The planar photoluminescent lamp of claim 1, wherein the plurality of straight channels are formed substantially in parallel.

5. The planar photoluminescent lamp of claim 1, wherein the ratio of the width $A_c$ of each of the first capacitive portion and the second capacitive portion to the width $A_r$ of the resistive portion is in the range of about 1 to 100.

6. The planar photoluminescent lamp of claim 1, wherein each of the first capacitive portion and the second capacitive portion has a cross-sectional shape selected from the list of a circle, an oval, a closed loop, a triangle, a quadrilateral and a polygon.

7. The planar photoluminescent lamp of claim 1, wherein the resistive portion has a cross-sectional shape selected from the list of a circle, an oval, a closed loop, a triangle, a quadrilateral and a polygon.

8. The planar photoluminescent lamp of claim 1, wherein each channel is further formed with a first shoulder portion connecting the resistive portion with the first capacitive portion.

9. The planar photoluminescent lamp of claim 8, wherein the first shoulder portion is formed such that the width of the channel is gradually changed from the width $A_r$ of the resistive portion to the width $A_c$ of the first capacitive portion.

10. The planar photoluminescent lamp of claim 8, wherein the first shoulder portion is formed such that the width of the channel is sharply changed from the width $A_r$ of the resistive portion to the width $A_c$ of the first capacitive portion.

11. A planar photoluminescent lamp, comprising:
   a. barrier means having a plurality of straight channels, wherein the plurality of straight channels are not connected to each other, and each channel is with a first end, an opposite, second end and an axis, and is formed with a resistive portion characterized by a width, $A_r$, and a first capacitive portion characterized by a width, $A_{c1}$, such that $A_{c1} > A_r$, wherein the first capacitive portion is located at one of the first end and the second end and between that one end and the resistive portion, and wherein the plurality of straight channels has at least a first channel and a second channel configured such that the width of the first capacitive portion of the first channel and the width of the first capacitive portion of the second channel are different; and
   b. at least one electrode positioned substantially perpendicular to the axis of a channel and extending over the first capacitive portion of each of the plurality of straight channels.

12. The planar photoluminescent lamp of claim 11, wherein each of the plurality of straight channels is further formed with a second capacitive portion located at the other end of the first end and the second end such that the resistive portion is between the first capacitive portion and the second capacitive portion.

13. The planar photoluminescent lamp of claim 12, further comprising an additional electrode positioned in proximity with the other end of the first end and the second end, substantially perpendicular to the axis of the channel, and extending over the second capacitive portion of each of the plurality of straight channels.

14. The planar photoluminescent lamp of claim 12, wherein the second capacitive portion of each of the plurality of straight channels is characterized by a width, $A_{c2}$, such that $A_{c2} > A_r$.

15. The planar photoluminescent lamp of claim 14, wherein the ratio of the width $A_{c2}$ of the second capacitive portion to the width $A_r$ of the resistive portion is in the range of about 1 to 100.

16. The planar photoluminescent lamp of claim 15, wherein the ratio of the width $A_{c1}$ of the first capacitive portion to the width $A_r$ of the resistive portion is in the range of about 1 to 100.

17. The planar photoluminescent lamp of claim 11, wherein each of the plurality of straight channels is further formed with a first shoulder portion connecting the resistive portion with the first capacitive portion.

18. The planar photoluminescent lamp of claim 17, wherein the first shoulder portion is formed such that the width of the channel is gradually changed from the width $A_r$ of the resistive portion to the width $A_{c1}$ of the first capacitive portion.

19. The planar photoluminescent lamp of claim 17, wherein the first shoulder portion is formed such that the width of the channel is sharply changed from the width $A_r$ of the resistive portion to the width $A_{c1}$ of the first capacitive portion.

20. A liquid crystal display (LCD) system, comprising:
   a. an LCD panel; and
   b. at least one lamp for producing light to illuminate the LCD panel, the at least one lamp comprising:
      i. barrier means having a plurality of straight channels, wherein the plurality of straight channels are not connected to each other, and each channel is with a first end, an opposite, second end and an axis, and is formed with a resistive portion characterized by a width, $A_r$, and a first capacitive portion characterized by a width, $A_{c1}$, such that $A_{c1} > A_r$, wherein the first capacitive portion is located at one of the first end and the second end and between that one end and the resistive portion and wherein the plurality of straight channels has at least a first channel and a second channel configured such that the width of the first capacitive portion of the first channel and the width of the first capacitive portion of the second channel are different; and
      ii. at least one electrode positioned substantially perpendicular to the axis of a channel and extending over the first capacitive portion of each of the plurality of straight channels.

21. The LCD system of claim 20, wherein each of the plurality of straight channels is further formed with a second capacitive portion located at the other end of the first end and the second end such that the resistive portion is between the first capacitive portion and the second capacitive portion.

22. The LCD system of claim 21, wherein the second capacitive portion is characterized by a width, $A_{c2}$, such that $A_{c2} > A_r$.

23. The LCD system of claim 20, wherein the at least one lamp further comprises an additional electrode positioned in proximity with the other end of the first end and the second end, substantially perpendicular to the axis of the channel, and extending over the second capacitive portion of each of the plurality of straight channels.

24. A planar photoluminescent lamp, comprising:
   a. barrier means having at least a first channel and a second channel, wherein the first channel is with a first end, an opposite, second end and an axis, and is formed with a resistive portion characterized by a width, $A_{ra}$, and a first capacitive portion characterized by a width, $A_{ca}$ such that $A_{ca} > A_{ra}$, wherein the first capacitive portion is located at one of the first end and the second end and between that one end and the resistive portion, wherein the second channel is with a first end, an opposite, second end and an axis, and is formed with a resistive portion characterized by a width, $A_{rb}$, and a first capacitive portion characterized by a width, $A_{cb}$, such that $A_{cb} > A_{rb}$, wherein the first capacitive portion is located at one of the first end and the second end and between that one end and the resistive portion, and wherein the second channel is positioned substantially in parallel to the first channel, and wherein the first channel and the second channel are not connected to each other; and b. at least one electrode positioned substantially perpendicular to the axis of the first channel and the second channel and extending over the first capacitive portions of the first channel and the second channel, wherein $A_{cb}$ and $A_{ca}$ are different.

25. The planar photoluminescent lamp of claim 24, wherein the ratio of $A_{ca}$ to $A_{rb}$ is in the range of about 1 to 100.

26. The planar photoluminescent lamp of claim 25, wherein the ratio of $A_{cb}$ to $A_{rb}$ is in the range of about 1 to 100.

* * * * *